United States Patent [19]

Belanger et al.

[11] Patent Number: 5,174,213
[45] Date of Patent: Dec. 29, 1992

[54] FLOOR MOUNTED AUTOMOBILE CONVEYOR

[75] Inventors: Michael J. Belanger, Walled Lake; Robert J. Wentworth, Farmington Hills, both of Mich.

[73] Assignee: Belanger, Inc., Northville, Mich.

[21] Appl. No.: 753,411

[22] Filed: Aug. 30, 1991

Related U.S. Application Data

[63] Continuation-in-part of Ser. No. 643,714, Jan. 22, 1991, Pat. No. 5,133,264.

[51] Int. Cl.⁵ .............................................. B61B 13/00
[52] U.S. Cl. .................................................... 104/172.3
[58] Field of Search ...................... 104/172.3, 162, 163, 104/172.1, 172.2; 384/42, 44; 403/382, 375, 403; 198/844, 853

[56] References Cited

U.S. PATENT DOCUMENTS

| | | | |
|---|---|---|---|
| 2,888,300 | 5/1959 | Curtis et al. | 384/42 |
| 3,526,193 | 9/1970 | Vani | 104/172.3 |
| 3,894,629 | 7/1975 | Wakabayashi | 104/172.3 |
| 3,946,856 | 3/1976 | Herrera | 198/841 |
| 3,964,800 | 6/1976 | Grimes et al. | 198/841 |
| 3,971,325 | 7/1976 | Evans | 104/172.3 |
| 4,936,224 | 6/1990 | Weigele | 104/172.3 |
| 4,944,606 | 7/1990 | Lindsey et al. | 384/42 |

Primary Examiner—Robert J. Oberleitner
Assistant Examiner—Mark T. Le
Attorney, Agent, or Firm—Brooks & Kushman

[57] ABSTRACT

An above the floor conveyor is provided for moving automobiles or the like, horizontally across the floor surface with a pair of the vehicle's tires positioned in a guided track. The conveyor includes a base for installation upon the floor and a conveyor drive and driven sprocket about which an endless chain extends to form a loop having a drive flight spaced outboard of the guided track and a return flight laterally spaced outward of the drive flight. A wear bar having a wear strip, preferably made of an ultra high molecular weight plastic and resistant to undesirable wear as a result of relatively slidable support, may be included between the endless chain and a bottom portion of a channel retaining the endless chain. A drive mechanism rotates the drive sprocket causing the portion of the chain in the drive flight to advance in the direction of the vehicle movement. A number of dollies are affixed to the chain in a spaced apart relation and are pivotably attached to the chain and shiftable about an axis parallel thereto. The dollies may be alternatively positioned in the drive flight in an active position in which the dolly extends inwardly into the guide track for engagement with a vehicle tire and in an inactive position above the floor surface in which the dolly is pivoted out of the guided track sufficiently to provide clearance for the vehicle. An actuator is provided for selectively shifting the dollies between the active and inactive position on demand.

15 Claims, 7 Drawing Sheets

FLOOR MOUNTED AUTOMOBILE CONVEYOR

CROSS-REFERENCE TO RELATED APPLICATIONS

The present invention is a continuation-in-part application of U.S. Ser. No. 07/643,714, filed Jan. 22, 1991, now U.S. Pat. No. 5,133,264, entitled "Floor Mounted Automobile Conveyor."

TECHNICAL FIELD

This invention relates to conveyors and more particularly, to conveyors used for translating vehicles across a horizontal floor surface.

BACKGROUND ART

Conveyors for vehicles such as automobiles or the like are utilized frequently in drive-through car washes as well as other applications in which it is desirable to slowly advance a vehicle across a horizontal floor surface. One of the most common type of conveyors utilized is the "in the floor" type such as that shown in U.S. Pat. No. 4,576,098, Belanger et al. A guided track extends along the floor surface and the conveyor mechanism is oriented in an elongated trench below the floor immediately under the guided track. On demand, a dolly will rise out of an opening at the entrance end of the conveyor for engaging the tire of a vehicle which has been properly staged in the conveyor. The dolly will gradually advance the vehicle along the conveyor until the vehicle exits and the dolly drops below floor level to begin its said return flight. It should be noted that dollies have two alternative paths on the drive flight, one path below floor level where the dolly is totally out of the way and an alternative path above floor level within the guided track for engaging the vehicle tire. Dollies can be spaced sufficiently close together so as to enable a series of automobiles being translated along the conveyor to be positioned relatively close apart to achieve maximum vehicle through put.

Below the floor conveyors are widely used in North America and function quite satisfactorily, however, they are expensive to install due to the required concrete work necessary to embed the conveyor below the floor surface. The necessity for concrete work not only adds expense and length of construction and installation time, it becomes difficult and expensive to return the building to its original state if the building is to be subsequently used for a different purpose.

In order to minimize some of the problems associated with below the floor conveyors there have been many efforts over the years to build a commercially feasible above the floor conveyor for use in car washes or the like. Examples of prior art above the floor conveyors are illustrated in the following patents: U.S. Pat. No. 3,196,806, U.S. Pat. No. 3,677,190, U.S. Pat. No. 3,719,151, U.S. Pat. No. 3,744,433, U.S. Pat. No. 3,815,512, U.S. Pat. No. 3,861,324. Most of the preceding patents are not truly above the floor conveyors since a substantial part of the conveyor drive mechanism or the dolly activation mechanism is oriented below floor level.

Typical prior art floor mounted conveyors merely minimize the amount of concrete work necessary, cannot be installed upon a flat horizontal concrete surface unless a platform is used at least locally, to space the conveyor to floor. An exception to this general statement is U.S. Pat. No. 3,861,324 which has spaced the conveyor sufficiently above the floor as illustrated in FIG. 2, so as to enable the drive motor chain to pass beneath the platforms on which the vehicle tires ride. U.S. Pat. No. 3,744,433 also appears to be a truly above the floor conveyor of the "on demand" type. It should be noted that the "on demand" feature is achieved by removably connecting the dollies to the conveyor drive chain so that the dollies do not need to be transported along the drive flight of the conveyor in an inactive position. The mechanism required to remove and reinstall the dolly is relatively complicated adding to the cost and the complexity of the conveyor.

DISCLOSURE OF THE INVENTION

An object of the present invention is to provide a floor mounted conveyor which can be installed upon a flat, horizontal floor surface transporting automobiles there across at floor level.

Another object of the present invention is to provide a low cost, highly durable conveyor system that can call drive dollies on demand thereby enabling multiple vehicles to be positioned on the conveyor at any one time period.

Another object of the present invention is to provide a floor mounted conveyor which is relatively narrow in width, and sufficiently low in profile to enable the conveyor to be used in conjunction with conventional car wash equipment which must wash the sides of the vehicle.

Yet another object is to provide a wear bar having an elongate wear strip which is resistant to wear resulting from providing relative slidable support between an endless chain and the bottom portion of a support member such as a channel retaining the endless chain, thereby extending the working life of the support member and the endless chain.

Accordingly, a conveyor of the present invention is provided for installation upon a flat horizontal floor surface to transport a vehicle horizontally with a pair of the vehicle's wheels oriented in a guided track. A conveyor comprises a base for installation directly upon the floor surface and a conveyor drive sprocket and a conveyor idle sprocket pivotably attached to the base above the floor in spaced apart relation. An endless conveyor tensile member such as a chain or the like, extends about the conveyor drive and idle sprockets defining a drive flight parallel to and laterally spaced outboard of the guided track and a return flight spaced upward of the drive flight. A drive mechanism rotates the conveyor drive sprocket causing the drive flight to advance in the direction of vehicle movement. One or more dollies for engaging a tire of a vehicle oriented within the guided track is provided. A dolly is attached to the endless conveyor tensile member and pivotably shiftable about an axis parallel thereto between an active position in which the dolly extends inwardly into the path for engagement with a vehicle tire and an inactive position above the floor in which the dolly is pivoted out of the guided path. An actuator is provided to selectively shift the dolly between the active and inactive positions on demand. A wear bar having an elongate wear strip, resistant to wear as the result of relative slidable support, may be located between a bottom portion of a channel and the endless chain, thereby enhancing the working life of the channel and the endless chain.

BEST MODE FOR CARRYING OUT THE INVENTION

Figure 1:
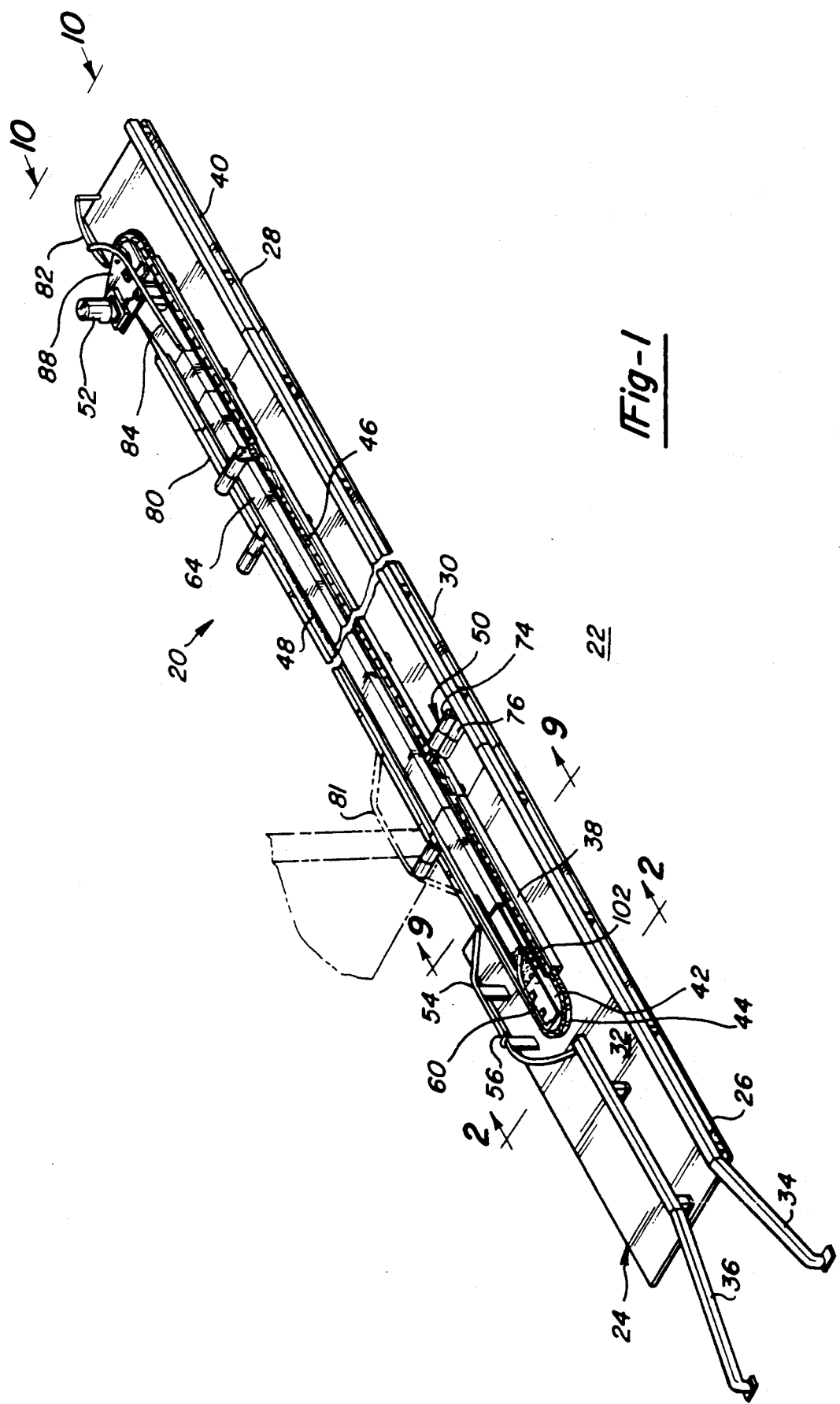
FIG. 1 is a perspective view of the conveyor with a center section broken away and with a doorway shown in phantom outline.

An automotive conveyor 20 of the present invention is illustrated in perspective view in FIG. 1. The center section of the conveyor is removed for illustration purposes and it should appreciated that the conveyor may be fabricated of a variety of different lengths depending upon the particular application. Conveyor 20 is positioned directly upon a generally flat horizontal floor surface 22. A conveyor is provided with a base 24 made up of three or more sections, entrance section 26, exit section 28 and one or more center sections 30. A guided track 32 is defined at least in part by the base providing a path for the wheels on one side of a vehicle to pass as the vehicle moves across the conveyor.

In the embodiment of the conveyor illustrated, the conveyor engages the wheels on the left side of the vehicle as would be the typical case when cars are driven on the right hand side of the road. Of course, the conveyor could be built to engage in the right side wheels of the vehicle for use in Europe and Japan where cars are driven on the left side of the road. Guided track 32 is sufficiently wide to accommodate common car and light truck tire widths. Inboard tire guide 34 defines the inboard boundary of guided track 32. The outboard boundary of the guided track is defined by outboard tire guide 36 at the entrance end and channel 38 in the central section of the conveyor.

A conveyor drive sprocket 40 and a conveyor idle sprocket 42 are pivotably attached to the upper side of the base in spaced apart relation. Chain 44 forms an endless loop extending about the conveyor drive and idle sprockets to define a drive flight 46 and a return flight 48. It should be appreciated rather a chain, alternative endless conveyor tensile members can be used such as a cogged belt or a flexible cable. A portion of chain 44 in the drive flight 46 is positioned within channel 38 as shown. Channel 38 is generally U-shaped in cross section having an open top. Pivotably affixed to the chain in spaced apart intervals are a plurality of dollies 50 for engagement with the vehicle tire oriented within the guided track. Dollies 50 are pivotably shiftable about an axis locally parallel to the chain between an active position in which the dollies extend inwardly into the guided track and the inactive position which is also above the floor in which the dolly is pivoted out of the guided path sufficiently to provide clearance for the vehicle. Drive means such as hydraulic motor 52 or the like, serves to rotate the conveyor drive sprocket causing the drive flight 46 portion of the chain to advance in the direction of vehicle movement.

Figure 2:
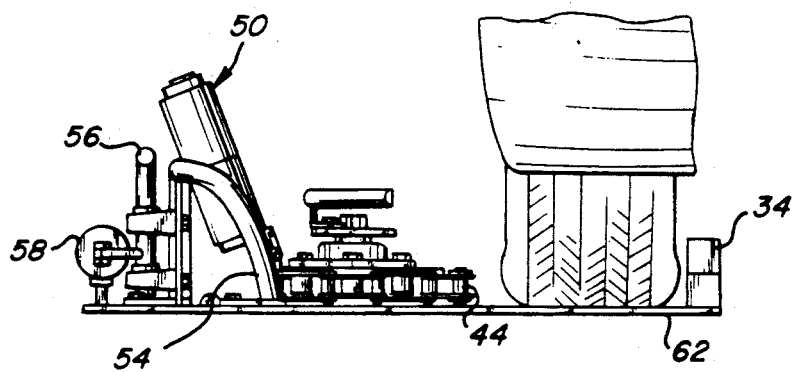
FIGS. 2-4 are a series of end views taken along line 2—2 of FIG. 1 showing a dolly to be activated in various sequential positions.
Figure 3:
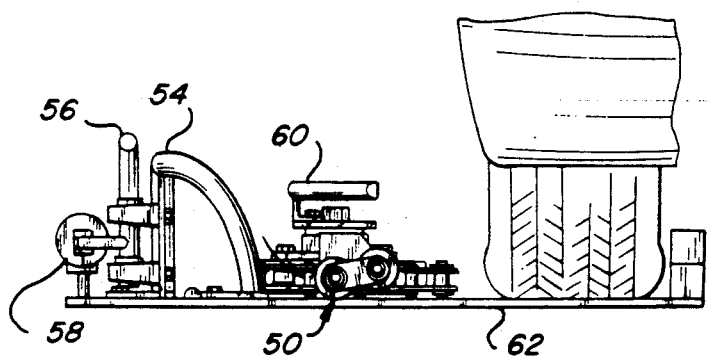
Figure 4:
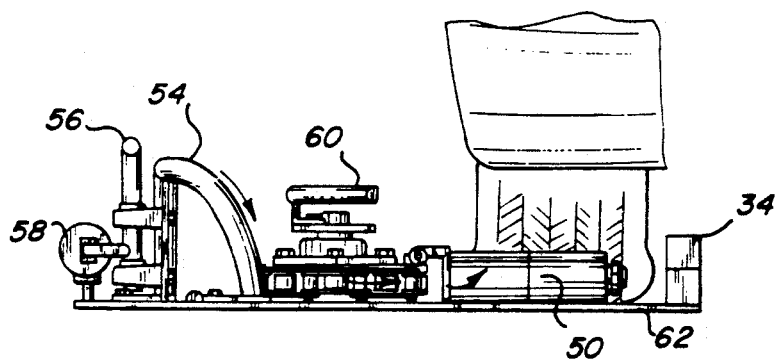

On the return flight 48 of the conveyor, actuator guide rail 54 and actuator arm 56 provide an actuator means for selectively shifting a dolly between an active and inactive position on demand. As shown in FIG. 2, a dolly in the return flight will pivot upward to an inclined position as the dolly rides up actuator guide rail 54. When one wishes to call a dolly, actuator arm 56 will be positioned out of the path of the dolly as illustrated in FIGS. 2-4 and the dolly will drop down actuator guide rail 54 as illustrated in FIG. 3 and move into the active position as shown in FIG. 4 to engage the tire of the vehicle.

Figure 5:
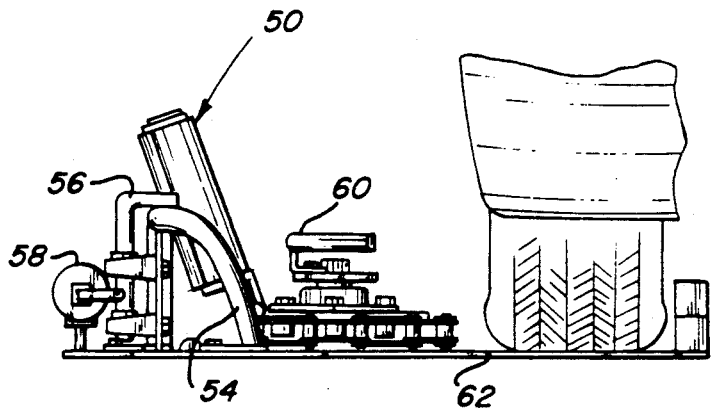
FIGS. 5-8 are a series of end view taken along line FIG. 2—2 of FIG. 1 showing an inactive dolly in various sequential positions.
Figure 6:
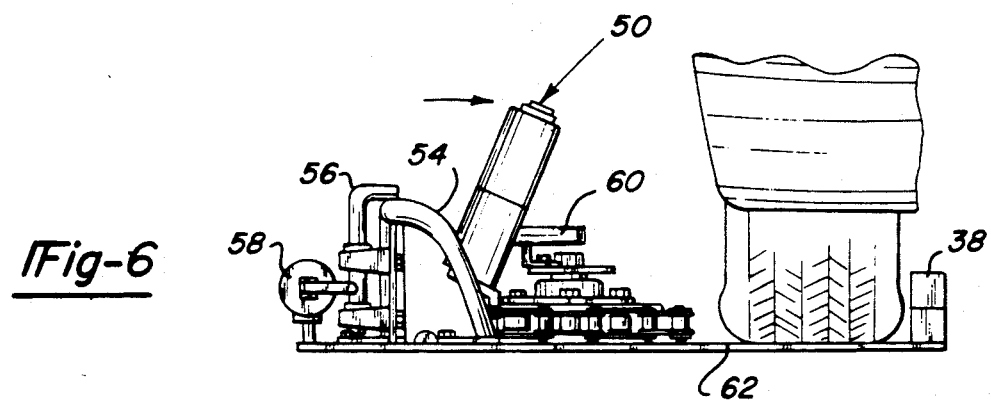
Figure 7:
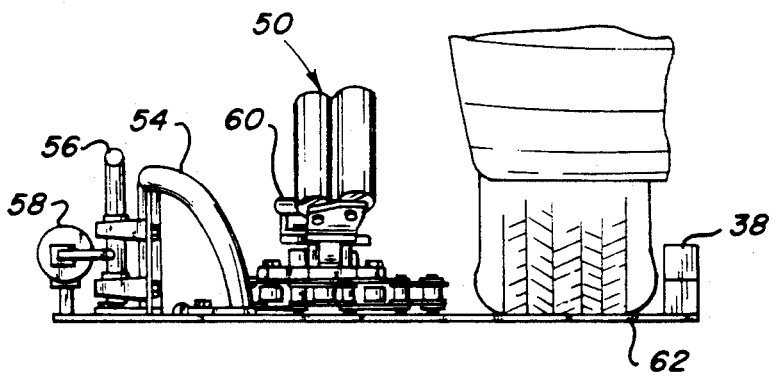
Figure 8:
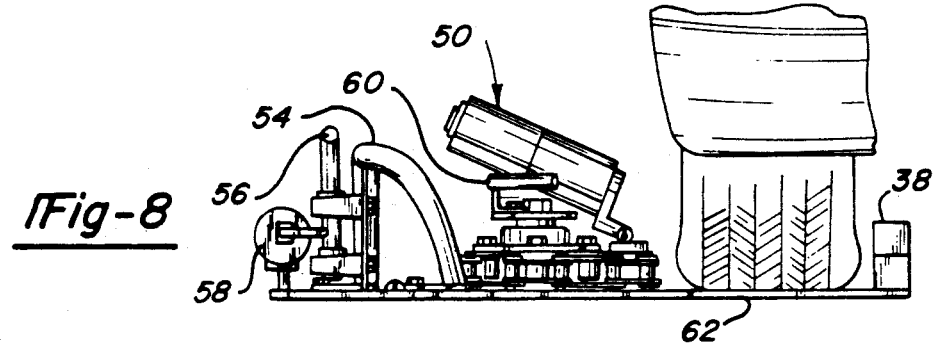

In FIGS. 5-6, a dolly being moved to the inactive position is illustrated in a series of sequential positions. In FIG. 5, dolly 50 is inclined as it rides up activator guide rail 54 in the manner illustrated in FIG. 2. In FIG. 5, however, actuator arm 56 has been rotated into the path of the dolly by pneumatic cylinder 58 and the associated linkage extending therebetween. When dolly 50 engages actuator arm 56 as illustrated in FIG. 6, the dolly rotates toward the vehicle toggling over center and coming to rest against dolly guide 60. As the dolly continues to advance about the idler as shown in FIGS. 7 and 8, it maintains sufficient clearance between the dolly and any portion of a vehicle which may be positioned adjacent thereto on the guide track to prevent interference. This enables vehicles to enter the conveyor entrance and stage while the conveyor is operating without having to coordinate the timing of the automobile and entry into the conveyor with dolly position. It should also be noted that with the close dolly spacing, the dolly immediately following the dolly engaging the front wheel of the tire may interfere with the rear tire if it were to intrude into the guided track. Preferably, dollies are spaced approximately 14 feet apart.

Figure 9:
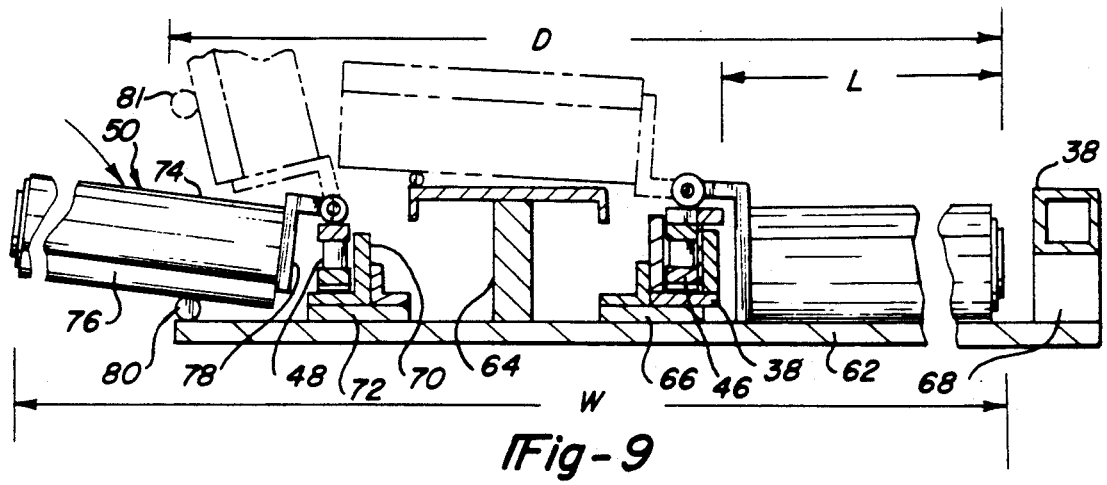
FIG. 9 is a cross sectional side elevation taken along line 9—9 of FIG. 1.

A cross sectional side elevation of the conveyor taken along line 9—9, in FIG. 1 is illustrated in FIG. 9. Base 24 is made up of flat plate 62 which is affixed to the floor surface, a generally T-shaped central member 64 which generally extends between the drive and idle sprockets and lies between the drive and return flights 46 and 48 of the chain. Central member 64 has a flat upper surface spaced slightly above the upper level of the chain providing a surface on which the dollies in the inactive position can translate. Channel 38 is affixed to and supported slightly above flat plate 62 by a series of spaced apart supports 66. Inboard tire guide 34 is also affixed to flat plate 62 and supported by a series of spaced apart riser 68. On the return flight, chain 44 is supported in an L-shaped channel 70 also periodically supported relative to the flat plate 62 by a series of support 72. Preferably the upright portion of channel member 64 will likewise have a series of spaced apart openings formed therein enabling entire conveyor to be easily cleaned to remove the accumulation of dirt and debris which would be deposited thereon during typical use in a car wash.

Drive dolly 50 is made up of a pair of counter rotating rollers, an upper roller 74 which cooperates with the vehicle tire and a lower roller 76 which rides upon plate 62. Bracket 78 connects upper and lower rollers 74 and 76 to chain 44. Bracket 78 and chain 44 are pivotably connected to one another about an axis which is spaced directly above and extends parallel to the chain. In FIG. 9, drive dolly 50 is shown in the active position extending inwardly (toward the vehicle). Dolly 50 is illustrated in phantom outline in the inactive position extending outwardly (away from the vehicle). It should be noted that the overall height of the dolly in the inactive position illustrated with the axis of the rollers generally horizontal, is sufficiently low to enable most conventional car wash equipment to wash the sides of the vehicle.

Figure 10:
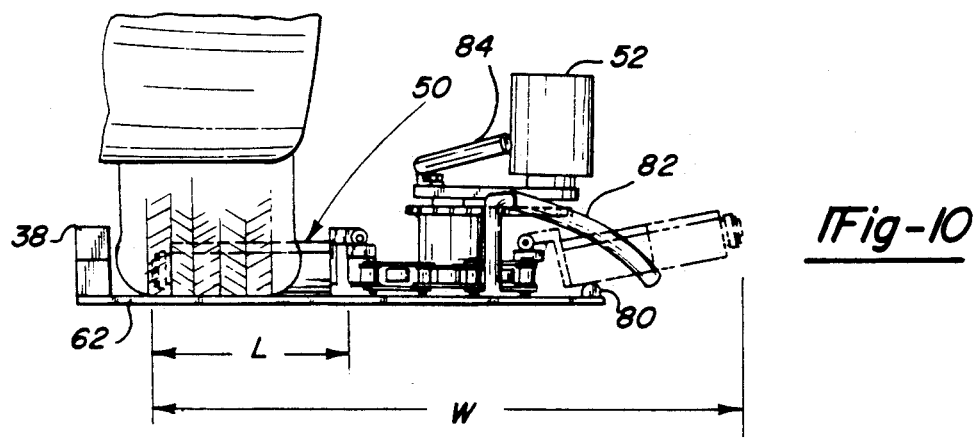
FIG. 10 is an end view taken along line 10—10 in FIG. 1, showing a dolly in the active position.

A conveyor of the present invention as shown in FIGS. 9 and 10 is relatively narrow compared to other floor mounted conveyors of the prior art. The width of the active conveyor mechanism W is less than four times the distance L where L is the distance the dolly projects into the guided path as illustrated in FIG. 9. Preferably, conveyor width W will be less than 4L. The minimal width is achieved as a result of utilizing a relatively small drive and idle sprocket and by carefully controlling roller position on the entrance and exit ends of the conveyor so as not to interfere with the vehicle or drive motor 52 and associated power transmission hardware. Preferably, the effective diameter of the sprocket (the pitch diameter) will be less than 2 L and most preferably, the effective diameter of the sprocket will fall within the range of 0.8 L to 1.5 L.

The left side of FIG. 9 illustrates the dolly in the return flight. The dolly will generally be positioned in a substantially horizontal position as illustrated in solid lines, riding upon a return rail 80. During the center section of the conveyor where car wash equipment will be frequently located, it is desirable to maintain the dolly in the low position illustrated so as not to interfere with the car washing equipment. Return rail 80 may be locally raised to provide a door clearance rail 81 as illustrated in phantom outline and in FIGS. 1 and 9 when it is necessary minimize the overall width of the conveyor to pass through a narrow doorway or the like. As shown in FIG. 9, the local overall width of the active conveyor mechanism is the distance from the extreme outermost portion of the dolly in the drive and return flights as illustrated by dimension W. By rotating the dolly in the return flight upward using rail 80, a significant reduction in overall width can be achieved as illustrated by dimension D. Preferably, dimension D is less than 3 L.

FIG. 10 illustrates an end view of the exit end of the conveyor taken along 10—10 in FIG. 1. Dolly 50 is in the active position and is pushing the vehicle tire forward. The dolly will remain in the flat position illustrated extending generally perpendicular to the chain locally as the dolly rotates around the sprocket and has passed under the drive motor 52. Once the dolly has passed under the drive motor, the dolly will engage return rail 80 and rotate up slightly as illustrated in phantom outline. Bumper 82 is formed of a flexible rubber hose or the like which deforms upwardly sufficiently to allow dolly 50 which is in the active position as shown in FIG. 10 to pass thereunder as the dolly rotates about the drive sprocket.

Figure 11:
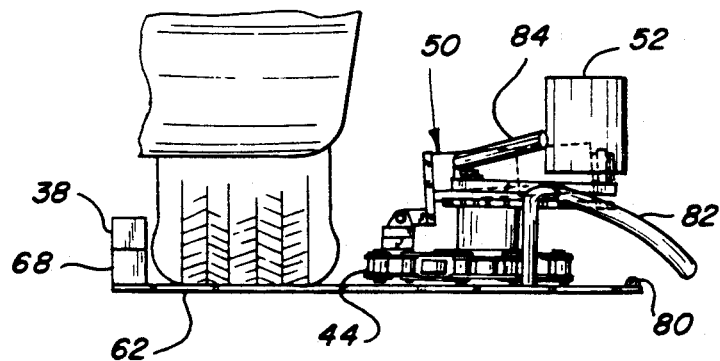
FIGS. 11-14 are a series of end views taken along line 10—10 of FIG. 1, showing a dolly in the inactive position rotating about the drive sprocket.
Figure 12:
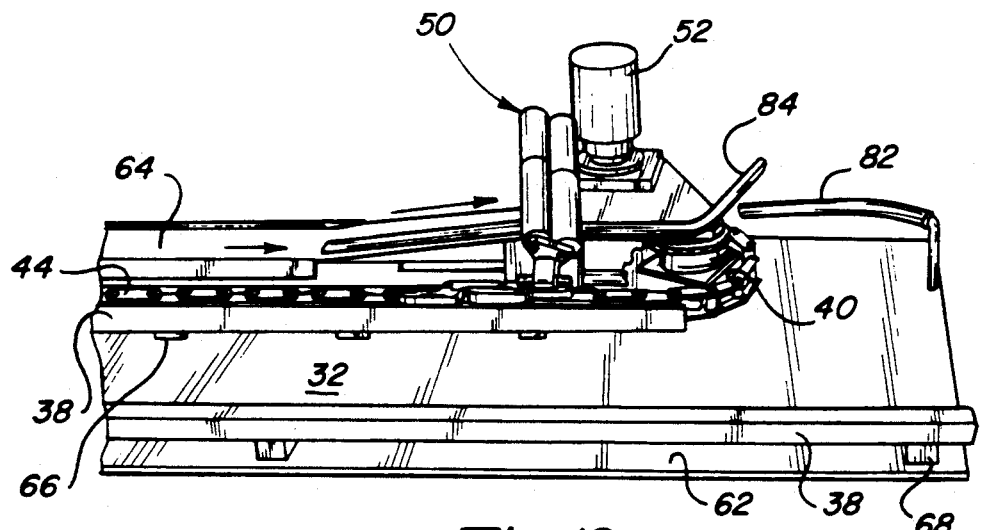
Figure 13:
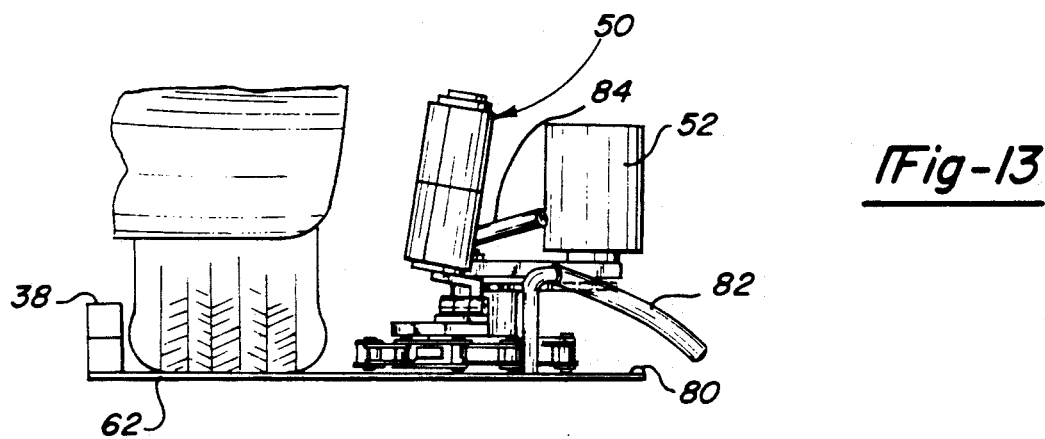
Figure 14:
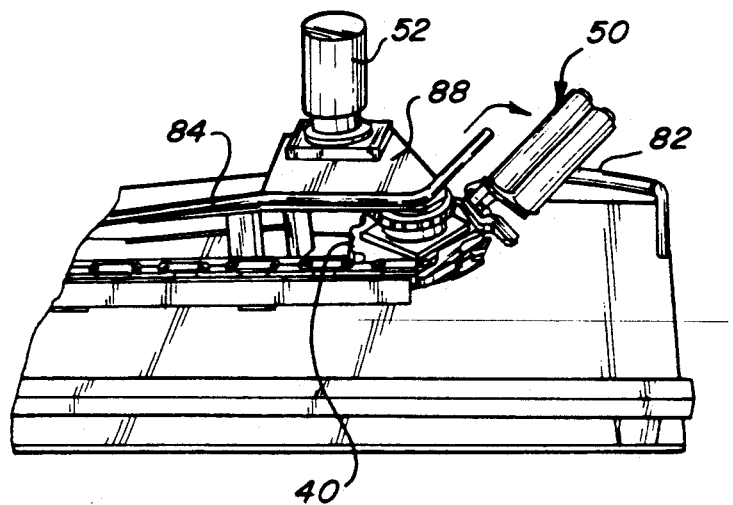

In FIGS. 11-14, a dolly 50 shown in the inactive position is illustrated as it passes around drive sprocket 40. In FIG. 11, dolly 50 is still in the generally horizontal position riding on the central member 64 as it approaches drive sprocket 40. As dolly 50 continues to advance toward the drive sprocket as shown in FIG. 12, the dolly rides up exit end dolly guide 84 as illustrated. The exit end dolly 84 pivots the dolly upward sufficiently to enable the dolly to pass by motor 52 without interference. As the dolly begins to round the sprocket as shown in FIG. 13, the dolly would be progressively inclined more and more until the dolly falls downward upon bumper 82 as shown in FIG. 14. As the dolly continues it will pass underneath the motor 52 in a substantially horizontal orientation and will then engage return rail 80 as illustrated in FIG. 10 and described previously.

Figure 15:
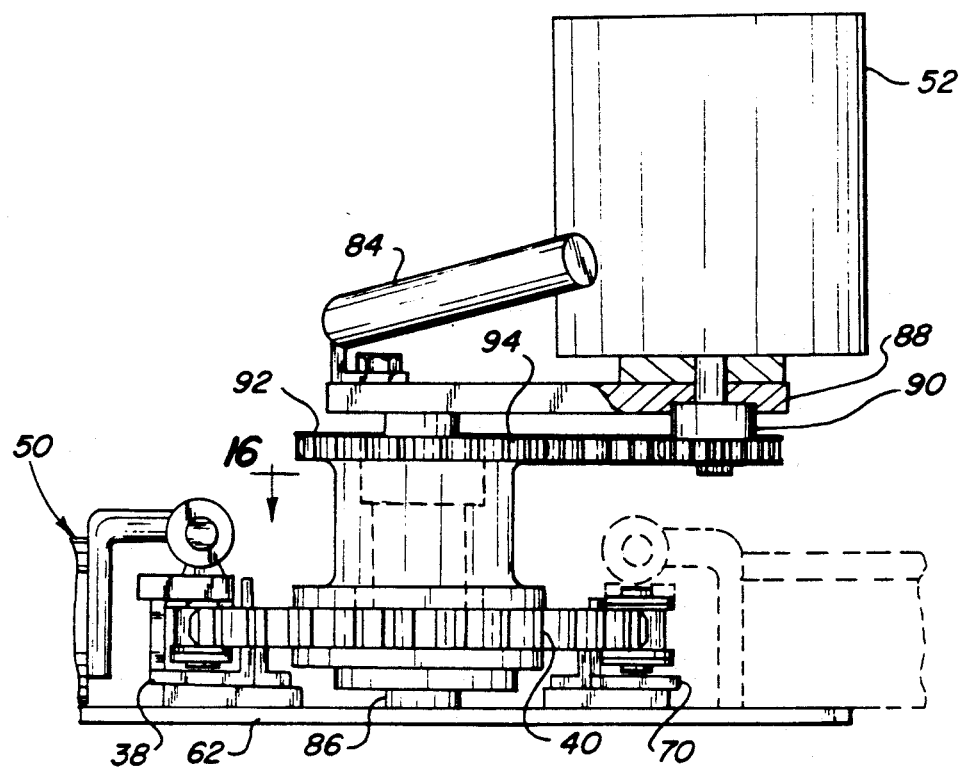
FIG. 15 is an enlarged partial end view taken line 10—10 of FIG. 1 showing the drive mechanism detail.

Motor 52 and the associated drive mechanism is shown in the large partially cut away side elevation in FIG. 15. Drive sprocket 40 is pivotably supported on a generally vertical shaft 86. Hydraulic motor 52 is affixed to mounting plate 88 which forms part of the base and is aligned in a generally vertical orientation as shown. The hydraulic motor has a rotary output shaft to which is attached a rotary drive member 90. Affixed to drive sprocket 40 is rotary driven member 92 which is operably connected to rotary driven member 90. In the preferred embodiment illustrated, rotary drive member 90 and rotary driven member 92 comprise a pair of sprockets which are interconnected by a chain which forms an endless flexible tensile member which extends thereabout. Endless flexible tensile member 94 lies in a plane which is spaced above the floor surface a distance sufficient to allow a dolly to pass thereunder without interference. As illustrated in FIG. 15, preferably hydraulic motor 52 is oriented outboard of the center line of the drive sprocket so as to provide adequate clearance for the dolly in the inactive position.

Figure 16:
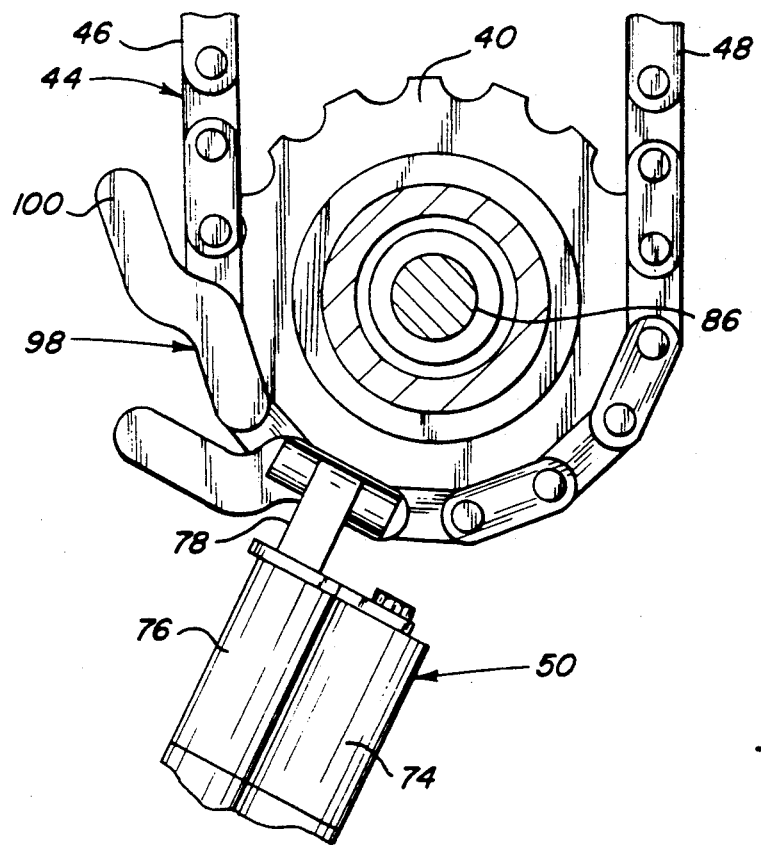
FIG. 16 is a plan view of the drive sprocket taken along line 16—16 in FIG. 15.
Figure 17:
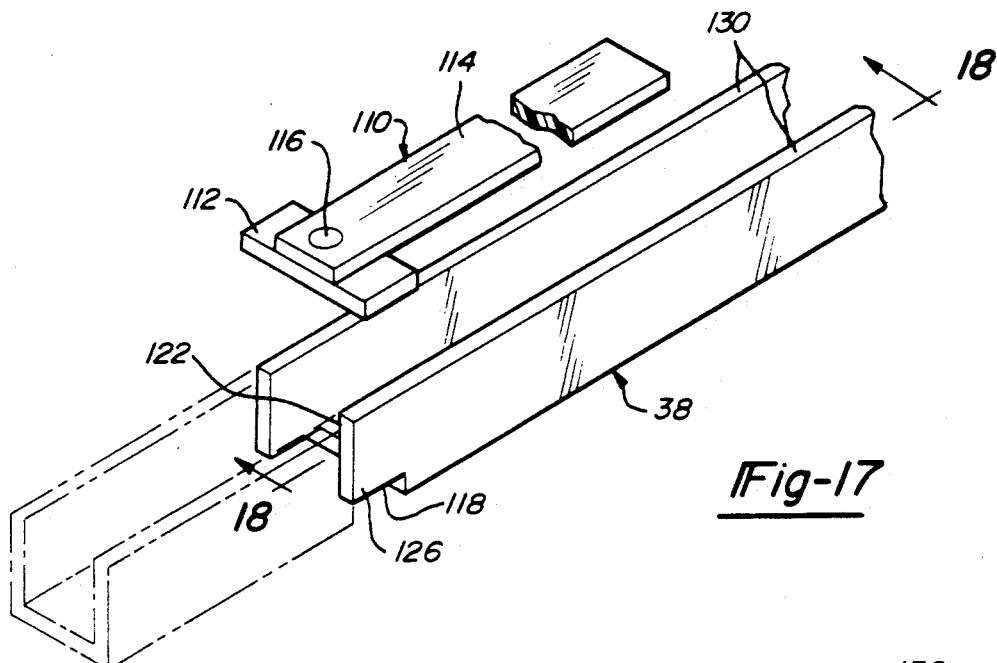
FIG. 17 is an enlarged exploded perspective view of a U-shaped channel, which supports an endless chain, and a wear bar including an elongate wear strip with the center section broken away, and an adjacent channel, shown in phantom outline.

Dollies 50 are pivotably attached to the upper surface of the chain and extend outwardly therefrom in a generally cantilevered manner as shown and described previously. As the dolly pushes on the vehicle tire, a significant reaction force will be extended at a point spaced from the chain thereby creating a moment on the chain link. A corresponding moment is therefore generated between the chain link and the U-shaped channel sufficient to maintain the dolly in the inwardly extended cantilevered position. In order to minimize the force exerted by the chain on the channel, the chain in the region immediately adjacent and following the dolly attachment is designed to become stiff once completely straightened out so as to distribute the reaction force resulting from the moment over a series of chain links. A preferred method of generating a locally stiff chain which is still capable of following the contour of the drive and idle sprocket is illustrated in the drawings, particularly FIGS. 1, 14 and 16. Modified links 98 on the upper surface of the chain have a trailing arm 100 portion extending therefrom for engaged the link, two modified links rearward as illustrated. Two links having a rearwardly trailing arm are sufficient to distribute the load. By using two links each having short trailing arms is greatly preferred to a single link with a very long arm since the long arm will protrude into the guided track and potentially harm the tires of a vehicle. In order to minimize a chain wear preferably, channel 38 will be formed of hardened steel and the high wear regions of the chain will be clad with a hardened plate to extend chain life. As illustrated in the drawings, the upper portion of the chain 44, particularly modified links 98 and trailing arm 100, extend above the portion of the U-shaped channel 38 which is oriented inboard of the chain. This design not only provides clearance for trailing arms 100, but the exposed upper surface of chain 44 which is moving at conveyor speed inhibits the tire from jumping over channel 38.

In a typical application, the conveyor drive and idle sprockets may be spaced apart 35 to 45 feet causing the total chain length to be in excess of 70 and 90 feet respectively. As the chain wears, it is necessary to move the idle sprocket away from the drive sprocket in order to maintain proper chain tension. Preferably, the idle sprocket is pivotably attached to a bearing block (not shown) slidably attached to the base plate. A spring 102 shown in FIG. 1 in phantom outline or screw type mechanism is provided to allow adjustment of the idle sprocket position to compensate for chain stretch resulting from wear. It is not uncommon for a chain of this length to stretch as much as a foot over its useful life necessitating at least six inches of idle sprocket adjustable movement. While this idle sprocket adjustment feature is very typical of conveyors of the prior art, in the present invention it is preferred that the entrance end dolly guide 60 be affixed to the slidable bearing block in order to maintain proper dolly orientation regardless of chain wear.

An alternative embodiment is shown in FIGS. 17-21 for enhancing the working lives of elongate support members, such as channels 38 and 70, by providing a wear bar 110 between the channels 38 and 70 and chain 44. Wear bar 110 is preferably T-shaped and includes a laterally extending anchoring block 112, a longitudinally extending elongate wear strip 114, and a fastener 116 for securing the anchoring block 112 to wear strip 114. Preferably, fastener 116 is a rivet. Wear strip 114, preferably, is made of an ultra high molecular weight polyethylene material such as Polystone, which is a trademark of and is sold by Impact Plastics of Gastonia, N.C. This particular material is self-lubricating and has high-slip properties. Anchoring block 112 is preferably rectangular in shape and is made of steel, although other shapes and materials may also be used.

Figure 18:
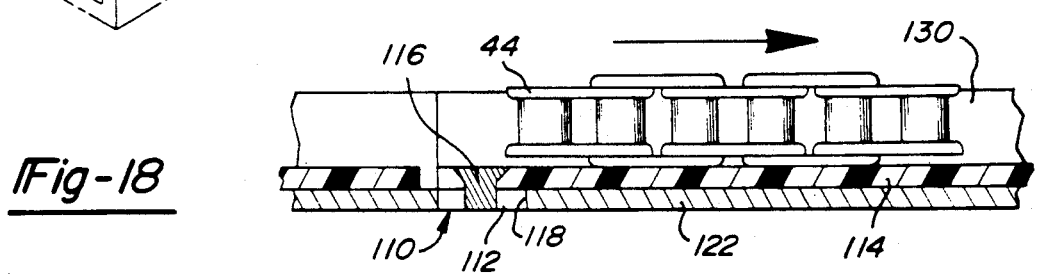
FIG. 18 is a sectional view, taken along line 18—18 of FIG. 17, showing a wear strip of the wear bar disposed between the bottom portion of a channel and an endless chain.
Figure 19:
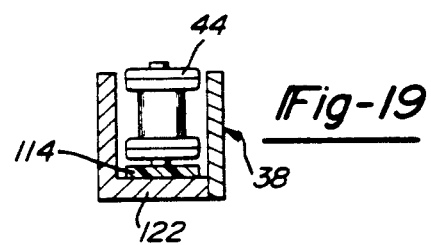
FIG. 19 is a partial sectional view showing a wear strip disposed between the endless chain and a U-shaped channel.
Figure 20:
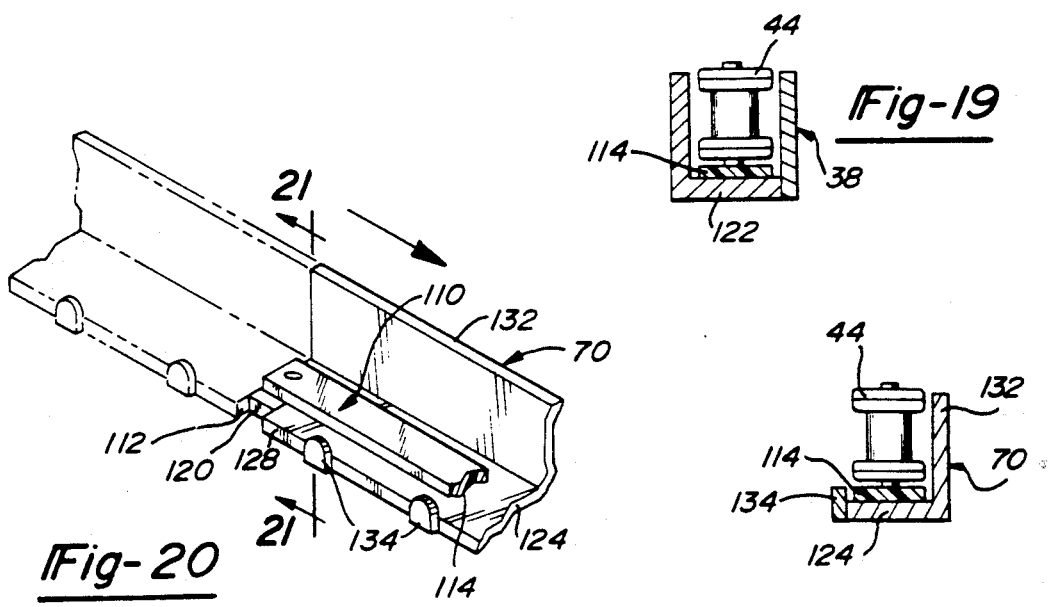
FIG. 20 is an enlarged perspective fragmentary view of L-shaped channels retaining a wear bar used to support the endless chain during its return flight.
Figure 21:
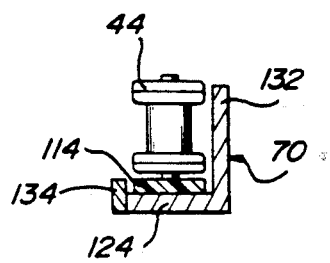
FIG. 21 is a cross-sectional view similar to one taken along line 21—21 of FIG. 20 showing a wear strip of a wear bar disposed between a portion of the endless chain and the bottom portion of an L-shaped channel.

In this particular embodiment, U-shaped channel 38 and L-shaped channel 70 have rectangular notches 118 and 120, located in bottom portions 122 and 124, which are sized and configured to snuggly retain anchoring block 112 therewithin. The notches 118 and 120 are preferably cut in the upstream ends 126 and 128 of channels 38 and 70, as shown in FIGS. 18 and 20, with wear strips 114 being tensilely suspended from anchoring blocks 112 and extending downstream or in the direction of movement of chain 44 as is indicated by the arrow in FIGS. 18 and 20.

Lateral support is provided to wear strip 114 by spaced apart side portions 130 on channel 38 and by side portion 132 and tabs 134 on channel 70. Wear strips 114 are located between chain 44 and bottom portions 122 and 124, respectively, of channels 38 and 70. Preferably, notches 118 and 120 extend beneath the side portions 130 and 132 and the anchoring blocks 112 are sufficiently long such that one or both ends of the anchoring blocks 112 will be vertically restrained by side portions 130 and 132 when wear bar 110 is installed within the notches 118 and 120.

In operation, wear bar 110 is installed by removing chain 44 and twisting wear strip 114 so as to position anchoring block 112 appropriately into either notch 118 or 120 of channels 38 and 70, with wear strips 114 extending downstream. Note that no tools are needed to install wear bar 110 within notches 188 and 120 of channels 38 and 70. Chain 44 is then reinstalled atop of wear bar 110. The weight and tensile force of chain 44 create a downward force which maintains, anchoring blocks 112 within notches 118 and 120 and wear strips 114 upon bottom portions 122 or 124 and between side portion 130 or side portion 132 and tabs 134.

The wear strips 114 prevent wear on bottom portions 122 and 124, thereby extending the operating lives of channels 38 and 70 and chain 44. When a wear strip 114 is worn down, wear bar 110 may be replaced with a similar wear bar 110.

While the best modes for carrying out the invention have been described in detail, those familiar with the art to which the invention relates will recognize various alternative designs and embodiments for practicing the invention as defined by the following claims.

What is claimed is:

1. A conveyor for moving a wheeled vehicle across a floor surface with a pair of the vehicle's wheels oriented in a guided track, the conveyor comprising:
   a conveyor drive sprocket and a conveyor idle sprocket orientated in spaced apart relation;
   an endless chain extending in a loop about the conveyor drive and idle sprockets defining a drive flight parallel to and beside the guided track and a return flight spaced therefrom;
   drive means for rotating the conveyor drive sprocket to cause the drive flight to advance in a downstream direction;
   a dolly for engaging a vehicle wheel in the guided track, the dolly being attached to the endless chain;
   an elongate channel for slidably supporting the endless chain thereon, the channel being U-shaped in cross-section and having a pair of spaced apart side portions, a bottom portion and upstream and downstream ends; and
   an elongate wear strip and an anchoring block connected together to form a T-shape, the wear strip being made of a non-metallic wear resistant material and being cooperatively retained between the bottom portion of the channel and the endless chain to minimize wear and the anchoring block being removably attached to the channel.

2. The conveyor of claim 1 wherein the wear strip is made of plastic.

3. The conveyor of claim 2 wherein the plastic is an ultra high molecular weight polyethylene.

4. The conveyor of claim 1 wherein the channel has a notch located therein in which the anchoring block is received and removably retained with the wear strip being tensilely suspended from the anchoring block.

5. The conveyor of claim 4 wherein the notch is located in the upstream end of the channel.

6. The conveyor of claim 1 wherein there are a plurality of wear strips and anchoring blocks and a plurality of channels.

7. The conveyor of claim 6 wherein each anchoring block is secured to a respective channel.

8. The conveyor of claim 7 wherein each channel has a notch located in its upstream end with a respective anchoring block secured therewithin.

9. A replaceable T-shaped wear bar for use with an elongate channel of a conveyor having a bottom portion for slidably supporting an endless chain thereon, the wear bar comprising an anchoring block extending laterally and connecting to a wear strip extending longitudinally to form a T-shape, the anchoring block being received and releasably retained by the channel and the elongate wear strip being sized to fit within the channel and being formed of a wear resistant material, the wear strip being located between the bottom portion of the channel and the endless chain to minimize wear.

10. The wear bar of claim 9 wherein the wear strip is made of plastic.

11. The wear bar of claim 10 wherein the plastic is an ultra high molecular weight plastic.

12. The conveyor of claim 1 wherein the anchoring block is manually and removably secured to the channel.

13. The conveyor of claim 4 wherein the notch is formed in the bottom portion of the channel whereby the anchoring block is manually and removably secured beneath each of the side portions and against the bottom portion without the use of any tools.

14. The conveyor of claim 4 wherein the wear strip is twistable whereby the anchoring block may be manually and releasably secured within the notch without the use of any tools.

15. A replaceable T-shaped wear bar for use with a conveyor having an elongate channel which is U-shaped in cross-section having a pair of spaced side portions and a bottom portion for slidably supporting an endless chain thereon, the channel further having a notch therein, the wear bar comprising:

an anchoring block extending laterally and an elongate wear strip connected thereto and extending longitudinally to form the T-shaped wear bar, the elongate wear strip being sized to fit within the channel are being formed of a wear-resistant material, the wear strip being located between the bottom portion of the channel and the chain to minimize wear;

wherein the wear strip is twistable whereby the anchoring blocks may be manually and releasably secured within the notch without the use of any tools.

* * * * *